the control voltage which is applied in common to the two control circuits 13 and 51. The control voltage is generated in response to a control signal applied to the terminal 54 through a resistor 55.

In accordance with another aspect of this invention, the feedback signal is obtained from the load 11 through a circuit which is, again, isolated from the main load circuit. A potential transformer 57 has its primary connected across the load to measure the load voltage. The secondary of the transformer 57 has two diodes 60 and 61 connected at the ends thereof, the secondary being center-tapped and grounded to generate a full-wave rectified voltage at a terminal 62 having a peak value varying with the load voltage. A plurality of Zener diodes 63 through 66 couple terminal 62 to the resistor 56. A plurality of resistors 70, 71 and 72 are individually connected in parallel with each of the Zener diodes 64 through 66 respectively. The operation of this circuit is fully described in application Ser. No. 836,816 filed concurrently herewith and assigned to the same assignee as the present invention. In accordance with that discussion it is noted that as the voltage at the terminal 62 increases, the Zener diodes individually breakdown thereby varying the resistive impedance between terminals 62 and 54 in a nonlinear manner. Proper resistor and diode selection provides a current output at the terminal 54 which varies as the square of the load voltage. That is, if the input is proportional to the load voltage $E_L$, then the output current is proportional to $E_L^2$. Assuming a substantially constant load resistance, the feedback current is then a representation of the power input to the load. If load power differs from the input value, the difference is integrated by an operational amplifier 52 and the capacitor 53 to alter the control signal to minimize the error. Addition of this feedback circuit to the full-wave control system provides extremely good linearity and line voltage compensation.

FIG. 7 schematically illustrates how a circuit embodying this invention can be applied to a balanced three-phase system. Each phase has an SCR and diode in parallel and oppositely poled. For example, one phase comprises an SCR **12*a* and a diode 80*a*. Similar circuits comprising SCR's 12*b* and 12*c* and diodes 80*b* and 80*c* are used in the other two phases. Each of the SCR's 12*a*, 12*b* and 12*c* respond to control circuits 13*a*, 13*b* and 13*c* respectively which are, in turn, individually responsive to a common control voltage which may be applied in accordance with the various aspects of this invention. Each control circuit additionally energized in response to the individual voltage of the phase it is controlling. With reference to the means for generating the reference voltage shown in FIG. 1, such means can be easily adapted to a three-phase circuit in a manner well known in the art. For purposes of discussion, control circuit 13*a* is shown as being energized by being connected to the anode of the SCR 12*a* and to a signal ground conductor 81. In operation, the three-phase source 83 energizes a three-phase load 84; and each of the control circuits can be individually balanced to assure that the DC content of the load current to the three-phase load 84** is minimal. Further, the advantages of isolation, line voltage compensation and linearity through a single feedback network and the other advantages and objects enumerated above are achieved in the circuit shown in FIG. 7.

Therefore, the control system described in the various illustrative embodiments incorporating the invention does provide a control function which is specifically adapted for use in the process control. It is especially adapted for use in areas where wide signal variations are encountered, where isolation is necessary and where good linearity and line voltage stability are necessary. It will be obvious that various modifications to this circuit may be made without departing from the true spirit and scope of the appended claims. For example, if isolation is not critical, the isolation afforded by the feedback transformers can be eliminated. Where input voltages do not vary over a wide range, the modifications of FIGS. 3 through 5 may be eliminated. If the load voltages are well regulated, the feedback system can be eliminated. In any case, however, it is felt that these and other modifications will be made and can be made without departing from the true spirit and scope of the claimed system.

What is claimed as new and desired to be secured by Letters Patent of the United States is:

1. In a system for controlling the average energization of an electrical load by an alternating current source including a silicon controlled rectifier coupling the electrical load to the alternating current source, the improvement of a control circuit comprising:
   a. reference signal generating means coupled to the alternating current source for generating a continuously variable, repetitive signal of a first polarity synchronized with the alternating current source, each reference signal repetition having a first wave portion dependent upon the alternating current source and a second wave portion independent of the alternating current source,
   b. control signal generating means for generating a control signal of a second polarity proportional to a desired energization level of the electrical load,
   c. pulse generating means coupled to said reference signal and control signal generating means and said silicon controlled rectifier and responsive to a predetermined relationship of the reference and control signals to turn on said silicon controlled rectifier during a first half cycle of voltage from the alternating current source at a time dependent upon the value of the control signal.

2. A control system as recited in claim 1 wherein said reference signal generating means comprises:
   a. rectifying means,
   b. capacitance means in series with said rectifying means to be charged by said alternating current source during a portion of a second half cycle of said alternating current source, said rectifying means isolating said capacitance means during the remainder of said second half cycle and the next first half cycle, and
   c. means coupling the voltage across said capacitance means to said pulse-generating means.

3. A control system as recited in claim 1 wherein said reference signal generating means comprises a capacitor and a series diode coupled to said alternating current source, said diode being poled to conduct during a second half cycle of said alternating current source, and a resistor coupling said capacitor to said pulse-generating means to thereby constitute a discharge path for said capacitor.

4. A control system as recited in claim 1 wherein said reference signal generating means comprises a first capacitor, a first resistor and a diode in series with said alternating current source and a second capacitor and a second resistor in parallel with said first resistor, said first resistor and second capacitor being connected to said diode, said diode being poled to conduct during the second half cycle, a junction of said second resistor and second capacitor being connected to said pulse-generating means.

5. A control system as recited in claim 1 wherein said pulse-generating means comprises switching means and transformer means and means for energizing said transformer means, said switching means changing conduction state upon predetermined relationship of the reference and control signals and said transformer means being responsive to the conduction change for coupling a gating pulse to said silicon controlled rectifier during the first half cycle.

6. A control system as recited in claim 5 wherein said switching means is conductive until the predetermined relationship occurs whereupon said switching means ceases to conduct, the energy in said transformer means being dissipated to generate the pulse applied to said silicon controlled rectifier.

7. A control system as recited in claim 6 wherein said silicon controlled rectifier has a gate and a cathode and said transformer means includes a transformer with its secondary winding connected to said gate and cathode and said primary winding connected through said switching means to said energizing means.

INVENTOR.
BERNHARD H. MEYER
BRUCE C. KEENE

BIPOLAR RECEIVER

BACKGROUND OF THE INVENTION

The present invention relates generally to data transmission circuits suitable for fabrication in integrated circuit form and more particularly to a bipolar receiver circuit for receiving data or information in the form of bipolar signals or signals in a succession of alternating polarity voltage levels and converting the bipolar signals to monopolar signals.

The invention is adapted for use in high speed data processing systems operating in a communications network environment wherein information is received from a data processor's peripheral equipment such as keyboard displays and entry devices, data processors, magnetic tapes, data sets or other sources of data which must be transmitted and received over transmission lines. The signals are commonly received from transmission line equipment such as data transmission sets termed "modems" or "data sets" in the form of bipolar signals and converted to monopolar signals for utilization by logic circuits in the data processing system.

The present trend in the data processing industry is toward processing an ever increasing volume of data which is being received in data communication digital processing systems from a large number of transmission lines in a communication network, such as in a time-sharing system. The present data processing equipment normally requires monopolar signals and connects to or interfaces with transmisson lines through bipolar receiver circuits or interface circuits which receive bipolar signals from the transmission lines and produce the required monopolar signals. Therefore, an ever increasing number of bipolar receiver circuits are required, particularly since the receiver circuits are normally required at each end of a transmission line.

Batch fabrication techniques such as monolithic integrated circuit process find particular application in the production of circuits for use in data communication digital processing systems wherein a large redundancy of communication circuits are required. Therefore, in the data processing and communications industries the batch fabrication of large numbers of active circuit devices of microminiature dimensions along with interconnections into a single monolithic semiconductor wafer or chip as an integrated circuit to form operative circuit arrangements is desirable.

It is desirable further to extend the advantages of increased performance and reliability and reduced size, weight, power consumption, and unit cost obtained with monolithic integrated circuits by incorporating the circuitry for performing the bipolar receiver function within a single chip of semiconductor material. However, existing communication interface circuits as fabricated using discrete components are relatively complicated and require additional active and passive components such as capacitors and precision resistors as well as the simultaneous use of NPN and PNP-type transistors in order to improve the performance characteristics of the circuit. This is difficult within the state of art of today's integrated circuit technology which most commonly provides only transistors of a single conductivity type within a single integrated circuit and avoids provision of capacitors and precision resistors.

With increased data processing and data transmission speeds it is also becoming increasingly important to accurately control the signal response with regard to time delay between the time at which an input signal's polarity changes and the time at which an output signal in response thereto has been provided to avoid the loss of data and to prevent the producing of erroneous information.

In one form of prior art discrete component bipolar receiver circuit a symmetrical input stage is employed with opposite halves of the symmetrical circuit containing identical components and functioning to provide input signals to a common output stage. The output stage then converts a positive input signal to a first positive polarity output signal or a negative input signal to a second positive polarity output signal. The input stage employs dual precision resistor networks or a plurality of diodes in each of the opposite halves of the stage to provide a dual threshold input circuit for establishing positive and negative threshold signal levels which must be exceeded before the input stage responds to provide signals indicating a change in polarity.

Also in the prior art a filter-bias connection means is provided intermediate between the input and output stages at which a capacitor and a bias voltage level are connected. The bias level provides a predetermined known level necessary to provide a known output signal when no input signals are present and the capacitor establishes a rise and a fall slope of leading and trailing edges of an output signal. During the time between input signals the capacitor may charge to uncertain signal levels, depending on the time of arrival of the next polarity change in the input signal, resulting in uncertain and uncontrolled delay times between changes in input polarity and the time for activating the output stage.

Thus, the prior art bipolar receiver circuits have the disadvantage of requiring discrete component fabrication resulting in increased size, greater power consumption, weight and unit cost and also the disadvantage of uncertain delay time control in the event of unequal times between input signal polarity changes and internal circuit variations. Furthermore, the prior art circuits employed capacitors and precision resistors liberally making the discrete component circuit design unsuitable for fabrication by integrated circuit techniques which are unable to fabricate capacitors and retain small dimensions of fabricate precision resistors and maintain high batch quantity production.

Accordingly, for high-speed data communications and present day integrated circuit data processing equipment, it is desirable that the communication circuit be suitable for fabrication by integrated circuit techniques and that delay times in circuit response be accurately controlled to avoid loss of received information and accurately receive information at high speeds.

SUMMARY OF THE INVENTION

In accordance with the invention claimed a bipolar receiver circuit is provided which is suitable for integrated circuit fabrication and which accurately controls delay times. This is accomplished in the illustrated embodiment of the present invention by utilizing a clamping means intermediate between the input and output stages. The clamping means limits the controlling signal level of a signal from the input stage to a clamped level slightly greater than a response level for activating an intermediate stage for each polarity of input signal thereby accurately controlling the delay time for circuit activation and response by maintaining the controlling signal levels within a predetermined range of operating limits.

Now in accordance with the present invention a bipolar receiver circuit is provided which is exceptionally well suited for fabrication by monolithic integrated circuit technology in that it utilizes only semiconductor devices and resistors, has high speed, and good noise immunity. Noise immunity is achieved in two ways by providing a dual threshold input stage utilizing threshold diodes and clamping means controlling a variable delay time which also rejects noise pulses. The circuit configuration also provides required equivalents of discrete component circuits by simultaneous use of NPN and PNP transistors and without use of capacitors and precision resistors. A further desired aim in monolithic technology is achieved by the elimination of capacitors to the extent possible. since capacitors also tend to decrease speed, introduce instability and decrease long term reliability. Improved response and reliability over discrete component bipolar receivers are thereby provided.

It is, therefore, an object of this invention to provide a bipolar receiver suitable for fabrication by integrated circuit techniques It is another object of this invention to provide a bipolar receiver having more accurate control of the delay times between receiving an input signal and the providing of an output signal.

Further objects and advantages of the present invention will become apparent to those skilled in the art as the description thereof proceeds.

BRIEF DESCRIPTION OF THE DRAWINGS

The present invention may be more readily described by reference to the accompanying drawing in which.

DETAILED DESCRIPTION OF OPERATION

Figure 1:
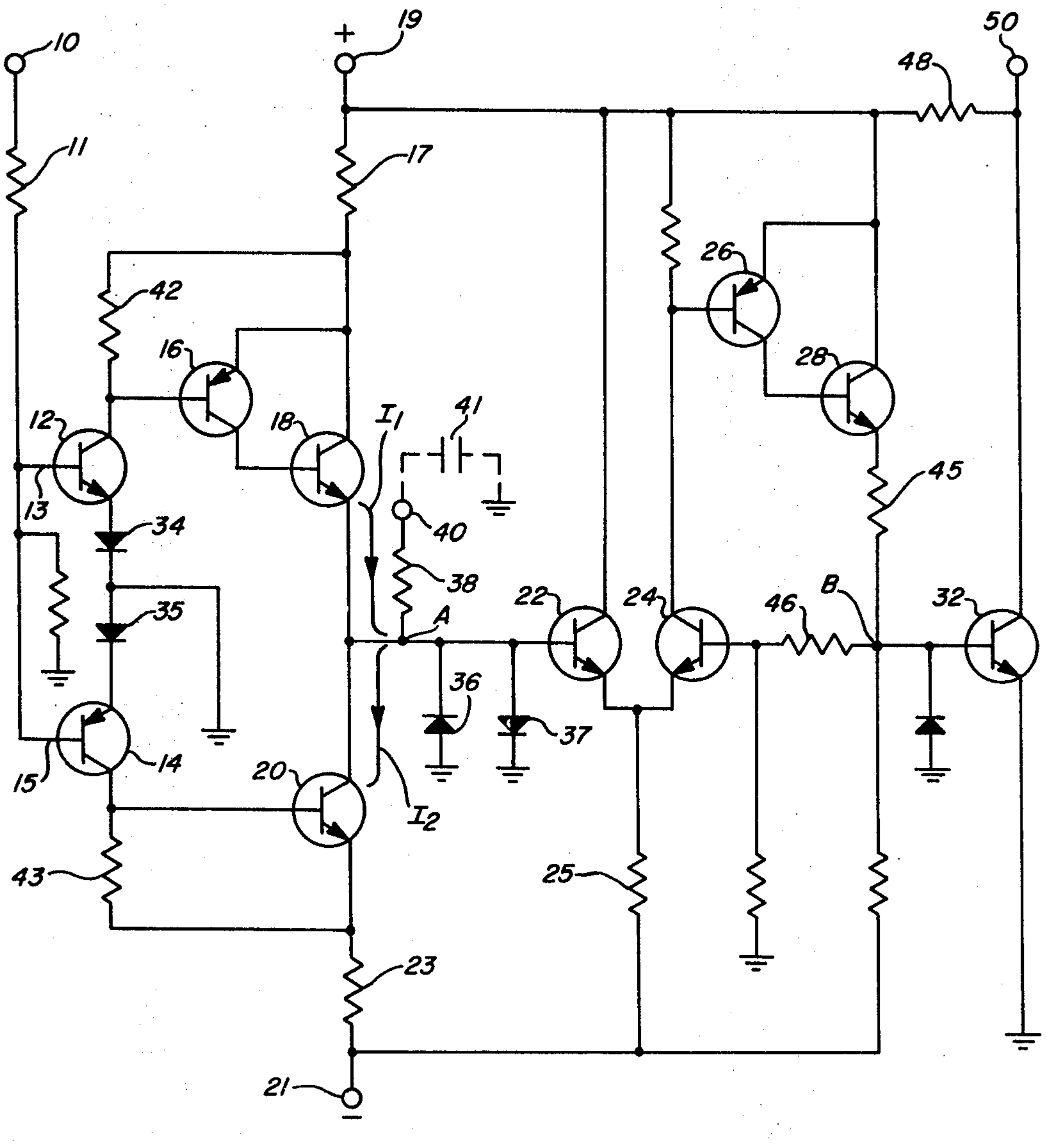
FIG. 1 is a schematic diagram of a bipolar receiver constructed in accordance with the present invention.

Referring to FIG. 1, there is depicted a bipolar receiver suitable for fabrication by integrated circuit fabrication techniques comprising an input stage having an input terminal 10 to which bipolar input signals are applied, input transistors 12 and 14, inverter transistor 16, amplifier transistor 18, and a switching transistor 20; an intermediate stage having emitter-coupled transistors 22 and 24, inverter transistor 26, and amplifier transistor 28; and an output stage having an output transistor 32 and an output terminal 50 at which monopolar output signals are presented. The bipolar receiver is further comprised of threshold diodes 34 and 35, clamping diodes 36 and 37, and biasing-filtering connection means comprised of resistor 38 and terminal 40.

Transistors 12, 18, 20, 22, 24, 28, 32 and conventional well-known NPN-type transistors and transistors 14, 16, and 26 are well-known PNP-type transistors. In PNP and NPN-type transistors, the base-collector junction is forward-biased when a negative voltage is applied to the N-type semiconductor material and a positive voltage is applied to the adjoining P-type semiconductor material. A transistor operates in a conductive condition when the base-emitter junction is forward-biased and the base- collector junction is reverse-biased. A junction is reverse-biased when a negative voltage is applied to the P-type semiconductor material and a positive voltage is applied to the adjoining N-type semiconductor material. If both the base-emitter junction and the base-collector junction are reverse-biased the transistor is nonconductive Transistors 22 and 24 provide a conventional current mode circuit of the emitter coupled variety operating as a differential amplifier in a standard current mode type of operation. Transistors 16 and 18 in combination and transistors 26 and 28 in combination provide what is termed a "doublet" wherein transistors 16 and 26 may be, by way of example, lateral PNP transistors such as described in H. C. Lin et al., "Lateral Complementary Transistor Structure for Simultaneous Fabrication of Functional Blocks," *Proceedings of IEEE*, Vol. 52, Dec. 1964 (pp. 1491–1495.) The doublet is particularly easy to fabricate in integrated circuit form and is the equivalent of a discrete component PNP transistor having a predetermined gain. In integrated circuit fabrication it is comparatively easy to fabricate a PNP-type transistor providing inversion with small gain and then provide the necessary gain with an NPN transistor thereby providing high gain and inversion in a small space on an integrated chip. As seen in FIG. 1 the collector of one transistor is tied together with the emitter of the other transistor in a doublet.

Operation of the overall bipolar receiver will now be described with reference to FIG. 1. If we assume that an input signal having alternating polarity levels is applied to input terminal 10 through resistor 11 to the base electrodes 13 and 15 of input transistors 12 and 14, respectively, and having a suitable potential of ±3 volts, transistors 12 and 14 will have their base-emitter junctions alternately forward-biased. Transistor 12 will be rendered conductive for a positive polarity input signal and transistor 14 will be conductive for a negative polarity input signal. A suitable dual threshold condition is established by threshold diodes 34 and 35 and the emitter-base characteristics of transistors 12 and 14 to establish minimum positive and negative potentials for rendering transistors 12 and 14 conductive.

When transistors 12 is rendered conductive by the presence of a positive signal at its base electrode, threshold diode 34 is forward-biased thereby providing a first control signal having a relatively negative potential at the base electrode of transistor 16 relative to its emitter electrode potential thereby rendering transistor 16 conductive. A positive potential is then provided through the emitter-collector junctions of transistor 16 and current weighting resistors 17 from a suitable positive potential which may be, by way of example, +5 volts applied to terminal 19 from a suitable voltage source. The positive potential is then present at the base of transistor 18. Transistor 18 is thereby rendered conductive to provide a first current signal at a junction point A whereby the current $I_1$ flows through current weighting resistor 17 and across the collector-emitter junctions of transistor 18 in the direction indicated to junction point A.

In a similar manner, when a negative potential is applied to the base electrode 15 of transistor 14, transistor 14 is rendered conductive by a forward-biasing of the base-emitter junction of transistor 14 such that a relatively positive second control signal to the base electrode of transistor 20 by means of the patch from ground potential through forward-biased threshold diode 35. Transistor 20 is thereby rendered conductive by the relatively positive signal in the base electrode whereby a suitable negative potential which may be, by way of example, −5 volts applied to a terminal 21. −5 volts may be provided from a suitable voltage source which provides a second current signal at junction point A having a direction of current flow $I_2$, as indicated, through current weighting resistor 23 from junction point A.

Leakage resistors 42 and 43 compensate for temperature variations which may affect transistor 20 or the combination of transistors 16 and 18, respectively. The threshold diodes 34 and 35 connected, respectively, between the emitter electrodes of transistors 12 and 14 provide for dual thresholding in the manner previously described. Diode 34 biases transistor 12 such that a predetermined positive potential is required to render transistor 12 conductive and diode 35 biases transistor 14 such that a corresponding predetermined negative potential is required to render transistor 14 conductive.

Junction point A of the intermediate stage is at a positive potential when a positive polarity input signal is present and at a negative potential when a negative input signal is present as a result of current flow provided by the input stage in the manner previously described. Transistor 22 having a base electrode potential at a first response level which is relatively positive with respect to its emitter electrode and corresponding to a positive input signal renders transistor 22 conductive by forward-biasing the emitter-base junction to provide for a current flowing across resistor 25. Transistors 22 and 24 are connected in a differential amplifier configuration having an operating condition such that one of transistors 22 and 24 is in a conductive state while the other is in a nonconductive state. The degree of conduction of transistors 22 or 24 is determined by means of a signal appearing across common emitter resistor 25. With transistor 22 in a conductive state the emitter voltage of transistor 24 becomes positive or, by way of example, toward +5 volts to render transistor 24 nonconductive. With transistor 24 nonconductive a first amplifier signal is provided at the base electrode of transistor 26 which becomes approximately, by way of example, at +5 volts potential rendering transistor 26 nonconductive which in turn renders transistor 28 nonconductive for providing a negative potential first gating signal at a junction point B.

In a similar manner when the potential at point A becomes more negative in response to a negative input signal to assume an opposite polarity response level, the base electrode of transistor 22 is relatively negative with respect to its emitter electrode, transistor 22 is rendered nonconductive and transistor 24 conductive. With transistor 24 conducting heavily, a negative second amplifier signal is present at the base electrode of transistor 26 rendering transistor 26 conductive to provide a gating signal having a positive potential signal at junction point B corresponding to a negative input signal at input terminal 10.

The current path from the emitter electrode of transistor 28 through resistors 45 and 46 to the base electrode of transistor 24 provides a positive feedback path resulting in snap action of transistor 24 due to the transistors 24, 26, 28, and the feedback path functioning as a Schmitt trigger circuit. The positive feedback path functions to provide an increase in a transition speed when transistor 24 is rendered conductive and nonconductive This results in an increase in transition speed between changes in potential of the gating signals.

The clamping diodes 36 and 37 connected to the intermediate stage at the junction point A or the base electrode of transistor 22 limit the maximum positive or first polarity clamped level and negative or opposite polarity clamped level excursions of a clamped signal at the base electrode of transistor 22 to provide for accurate delay time control in a manner to be described in detail hereafter. The accurate delay time control further provides for the rejection of noise in a manner to be described in detail hereinafter.

A bias-filter connection means comprising resistor 38 and terminal 40 is connected at junction point A to which may be connected an external bias signal of a predetermined polarity. The external bias signal is utilized to maintain a known potential or voltage signal at the base electrode of transistor 22 in the case where bipolar signals are not present at the input terminal thereby facilitating the provision of a known output signal from the bipolar receiver circuit when the input signals are disconnected and for use in a manner immaterial to this invention.

An external filter capacitor 41 is connected to terminal 40 which functions to provide a voltage signal having a described rise and fall slope of the potential at the base electrode of transistor 22. The rise and fall slope of the potential at the base electrode of transistor 22 establishes a delay time before transistor 22 becomes conductive or nonconductive. The resulting delay time functions to prevent the occurrence of short bursts of noise or extraneous signals from causing undesirable output signals and incorrect recognition of signals in a manner to be described in detail hereinafter.

The gating signals at junction point B provided from the intermediate stage are connected to the base electrode of output transistor 32 of the output stage. When a negative gating signal is present, transistor 32 is rendered nonconductive to provide a positive first output signal from an output terminal 50 as provided from a suitable positive voltage source such as +5 volts through output level adjust resistor 48. The first output signal may, for example, have a potential of approximately +5 volts. When a positive gating signal is present, transistor 32 is rendered conductive to provide a lower level positive second output signal, which, by way of example, may have a potential of approximately +0.2 volts, due to the conduction of transistor 32 providing a reduced collector-emitter junction voltage drop when in a conductive state. Accordingly, the first and second output signals from output terminal 50 are one of different predetermined like polarity potentials depending upon whether the input signal is of positive or negative polarity.

Accurate control of delay times between receiving an input signal and the time of response to provide an output signal from the bipolar receiver of FIG. 1 is accomplished by means of the clamping diode arrangement of diodes 36 and 37 connected to the intermediate state. The function of the clamping diodes 36 and 37 will be described with reference to FIG. 2 which illustrates a clamped signal waveform at junction point A or at the base of transistor 22.

Figure 2:
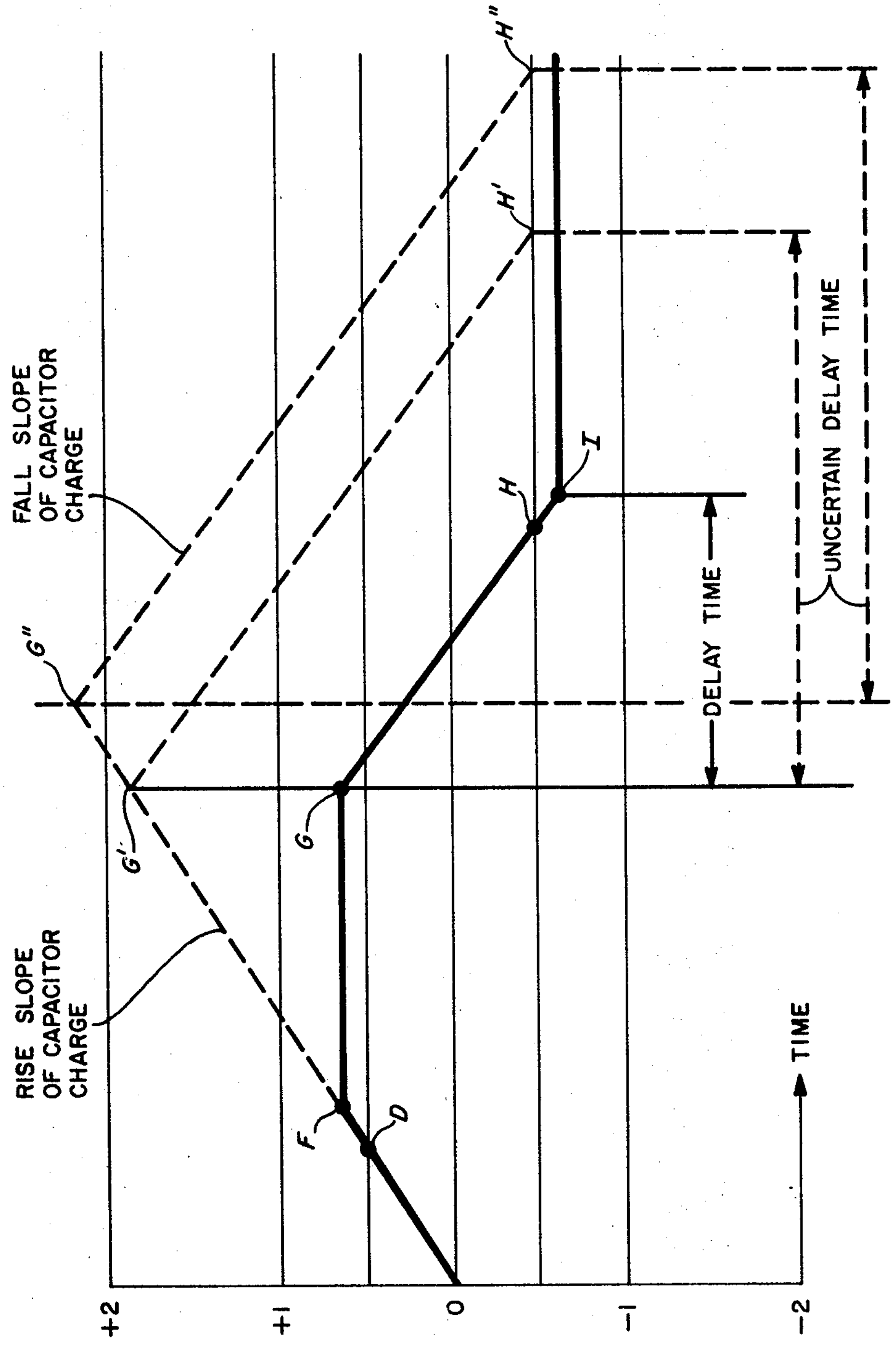
FIG. 2 is a waveform diagram illustrating waveforms of a signal provided at an intermediate stage in the circuit during accurate control of delay time response by the bipolar receiver.

With reference to FIG. 2 the waveform shown by a solid line represents the appearance of a clamped signal being applied to the base electrode of transistor 22 when capacitor 41 is connected to terminal 40 for filtering as previously described. With reference to the solid line waveform, when an input signal of a positive polarity is present, the filter capacitor connected to terminal 40 will charge to a positive potential or first polarity response level, shown at point D and which may be, by way of example, 0.5 volts, at which time transistor 22 is rendered substantially more conductive. Upon reaching a potential or first polarity clamped level shown at point F and which may be, by way of example, +0.6 volts, clamping diode 37 becomes forward-biased to maintain the potential applied to the base electrode of transistor 22 at the level of the voltage drop across the diode which, in this example, is +0.6 volts.

At the occurrence of the next input signal polarity reversal, shown at a point G, the capacitor beings to discharge and becomes charged in an opposite polarity direction until the capacitor is discharged to an opposite polarity response level or a value of −0.5 volts, as shown at point H, transistor 22 is rendered substantially less conductive and transistor 24 rendered substantially more conductive When the capacitor becomes discharged to an opposite polarity clamped level or a −0.6 volts potential, diode 36 becomes forward-biased to clamp the level of the signal present at junction point A or the base of transistor 22 at a −0.6 volts potential as illustrated at point I.

As a result of the clamping action of clamping diodes 36 and 37 the potentials of signals applied at base of transistor 22 are maintained at a first polarity clamped level of +0.6 volts following a positive polarity input signal transition and at an opposite polarity clamped level of −0.6 volts following a negative potential signal transition. A resulting delay time between points G and H representing a first clamped level and an opposite polarity response level, respectively, is therefore controlled by the clamping diodes 36 and 37. The delay time between the time of the change in an input signal occurring at G time and the time at which the conductive state of transistor 22 changes substantially at H time is established by the time at which the capacitor discharges from the clamped level of +0.6 volts and discharges to the −0.5 volt opposite polarity response level to control a substantial change in conduction of transistor 22.

The dashed waveform shown in FIG. 2 illustrates the potential at the base of transistor 22 for the condition when no clamping diodes are present and the capacitor charge is permitted to continue charging throughout the time interval that a positive polarity signal is being applied. Assuming that a negative polarity input signal occurs at the G′ time shown on the dashed waveform, the time required for the capacitor to discharge to the −0.5 volts potential for controlling the state of transistor 22 is indicated as H′ time. The result is delay time is therefore increased as indicated in FIG. 2.

With changes in circuit components and potentials during operating environments it is impossible to know at what level the capacitor becomes fully charged and as a consequence the time for delay in circuit response may become significantly changed before the next change in polarity of an input signal. Thus, an unpredictable delay time further illustrated by the waveform points G″ and H″. As is seen in FIG. 2, when the capacitor voltage becomes greater, the discharge rate of the capacitor being at a constant rate as shown by the slope of the waveform in FIG. 2 will accordingly require a greater time for the capacitor to be discharged to the −0.5 volt control level of transistor 22.

Accurate control of the delay time provides for rejection of noise pulses. With reference to FIG. 2, if we assume that a noise pulse having a width time less than the delay time is encountered, the response level of the intermediate stage represented by either points D or H will not be reached and there will be no response, thereby rejecting the noise pulse. Since the capacitor charge is controlled by the clamping diodes to be at a predetermined level, a capacitor 41, FIG. 1, having a charge capacity larger than the clamped level may be employed to adjust the rise and fall slopes to vary the delay time such that noise pulses having a width nearly equal to a data pulse may be rejected. If accurate control of delay time is not provided it is necessary to employ capacitors with lower charge capacities to prevent excessively long delay times for the case where long periods of time without a change in polarity are encountered.

The circuit configuration as illustrated in FIG. 1 for a bipolar receiver in integrated circuit form has provided for the elimination of capacitors and precision resistors since they are difficult to fabricate by integrated circuit techniques while still retaining the essential features of biasing and filtering. A dual threshold input is provided by the input stage through use of threshold diodes 34 and 35 without employment of precision resistors or a plurality of diodes in each symmetrical half of the circuit of incorporation of the reference threshold diodes in the emitter circuit instead of in the input signal path between a base or collector electrode of the input transistors. Furthermore, an increase in transition speed between changes in output signal voltage levels is achieved by employing a positive feedback path in the intermediate stage.

From the foregoing description it is seen that an improvement in the degree of circuit response control and accuracy of response as well as batch fabrication may be achieved by fabrication of circuits of his type using integrated circuit techniques. In particular, the improved bipolar receiver of this invention lends itself to the incorporation into integrated devices.

Although the invention has been disclosed specifically in terms of a particular polarity orientation it will be understood that similar bipolar receiver functions may be accomplished using this very circuit configuration by reversing the polarities through the circuit including changing transistors to opposite type of transistors such as PNP types to NPN types and NPN types to PNP types.

Thus, in accordance with the invention claimed, a new and improved bipolar receiver suitable for fabrication by integrated circuit techniques is provided in which more accurate control of delay is provided from that obtained by use of the prior art. Accordingly, the advantages of size, power consumption, lower cost, as well as improved performance are obtained.

While the principles of the invention have now been made clear in an illustrative embodiment there will be immediately obvious to those skilled in the art many modifications of structure, arrangements, proportions, the elements, materials and components used in the practice of the invention and otherwise, which are particularly adapted for specific environments and operating requirements without departing from those principles. The independent claims are therefore intended to cover and employ any such modifications, with the limits only of the true spirit and scope of the invention.

What is claimed is:

1. A communication circuit for converting bipolar input signals into monopolar signals suitable for fabrication by integrated circuit technology comprising: an input stage for receiving said bipolar signals, said input stage including two input transistors, a first inverter transistor, a first amplifier transistor and a switching transistor, each having a base electrode, a collector electrode and an emitter electrode, said two input transistors having base electrodes connected in parallel to receive said bipolar signals simultaneously and being responsive to said input signals of a first and an opposite polarity, respectively, two provide first and second control signals at their collector electrodes, said inverter transistor having a base electrode connected to receive said first control signal and being responsive to provide an inverted signal at a base electrode of said first amplifier transistor, said first amplifier transistor being responsive to provide a first current signal from a first voltage source and said switching transistor being responsive to said second control signal to provide a second current signal from a second voltage source; a biasing-filter connection means being connected to said input stage to receive said first and second current signals and being responsive to provide a voltage signal, said connection means having a capacitor connected thereto for establishing a rise and a fall slope of said voltage signal when said input signals change from said opposite to first and first to opposite polarity, respectively; a voltage clamping means connected to said input stage for receiving said voltage signal and being responsive during a succession of time intervals to provide a clamped signal having successively said rise slope, a first polarity clamped level, said fall slope, and an opposite polarity clamped level; and intermediate stage including first and second emitter-coupled transistors forming a differential amplifier, a second inverter transistor and a second amplifier transistor, said first emitter-coupled transistor being connected to said clamping means to receive said clamped signal at a base electrode of said first emitter-coupled transistor and being responsive at a first and an opposite polarity response level to bias said second emitter-coupled transistor in conductive and nonconductive conditions to provide first and second amplifier signals at a collector electrode of said second emitter-coupled transistor, said clamping means providing clamped levels having a greater level than said response levels to control a delay time between said clamped and response levels, said second inverter transistor having a base electrode connected to said collector electrode of said second emitter-coupled transistor to receive said first and second amplifier signals and being responsive to provide first and second inverted signals at a base electrode of said second amplifier transistor, said second amplifier transistor being responsive to said first and second inverted signals to provide first and second gating signals; and an output stage having an output transistor with a base electrode connected to said intermediate stage to receive said first and second gating signals and being responsive to provide first and second output signals of different voltage levels and like polarity at an output terminal.

2. The communication circuit of claim 1 further comprising: a dual thresholding means comprising a pair of diodes, one of said diodes being connected between an emitter electrode of each of said input transistors and a reference potential, said thresholding means operable to bias the first input transistor in a conducting condition when a bipolar signal of said first polarity signal exceeds a predetermined threshold voltage level and being operable to bias the second input transistor in a conducting condition when a bipolar signal of said opposite polarity signal exceeds a predetermined threshold voltage level.

3. The communication circuit of claim 1 further comprising an impedance means connected between said emitter electrode of said second amplifier transistor and a base electrode of said second emitter-coupled transistor to provide a positive feedback path, said path being from said emitter electrode of the second emitter-coupled transistor through said second inverter transistor, second amplifier transistor and said impedance means to the base electrode of said second emitter-coupled transistor and being operable in response to said first and second amplifier signals to provide snap action of said second emitter-follower transistor for providing an increase in transition speed between changes in output signal voltage levels.

4. A bipolar receiver circuit suitable for fabrication by integrated circuit techniques comprising: a first and a second input transistor each having a base electrode, a collector electrode, and an emitter electrode, said base electrode connected in parallel to a common input lead to receive a succession of input signals having alternate polarity input voltage levels, said first and second input transistors being NPN and PNP types, respectively; a pair of threshold diodes, one of said diodes being connected between the emitter electrode of each of said input transistors and ground potential, one of said diodes being operable to bias the first input transistor into a conductive condition during the presence of an input signal having a level exceeding a predetermined positive polarity threshold level at its base electrode and one of said diodes being operable to bias the second input transistor into a conductive condition to provide first and second control signals on their respective collector electrodes; a first doublet having a first PNP transistor with an emitter electrode connected to a collector electrode of a first NPN transistor having a base electrode connected to the collector electrode of said first input transistor and responsive to said first control signal to provide a first inverted signal to the base electrode of said first NPN transistor for biasing said first NPN transistor into a conductive condition for providing a first current signal from a first voltage source on an emitter electrode; an NPN-type switching transistor having a base electrode connected to the collector electrode of said second input transistor to receive said second control signal and being in a conductive condition during the presence of said second control signal to provide a second current signal from a second voltage source on an emitter electrode; a biasing-filtering connection means having a resistor connected between a connection terminal and the emitter electrodes of said first NPN transistor and said switching transistor at a junction point to receive said first and second current signals and being responsive to provide a voltage signal, said connection means having a capacitor connected to said terminal for establishing a rise and a fall slope of said voltage signal when said input signals change from said opposite to first and first to opposite polarity, respectively; a pair of oppositely poled clamping diodes connected between said junction point and a reference potential for receiving said voltage signal and being responsive during a succession of time intervals to provide a clamped signal having successively said rise slope, a first polarity clamped level, said fall slope, and an opposite polarity clamped level; first and second emitter-coupled NPN transistors forming a differential amplifier and having a base electrode of said first emitter-coupled NPN transistor connected to said junction point to receive said clamped signal to receive said first emitter-coupled transistor being operable in response to a first and an opposite polarity response level at its base electrode to bias said second emitter-coupled transistor into a conductive and a nonconductive condition, respectively, to provide a first and a second amplifier signal at its collector electrode, said clamping diodes providing clamped levels having a greater level than said response levels to control a delay time between said clamped and response levels; a second doublet having a second PNP transistor with an emitter electrode connected to a collector electrode of a second NPN transistor, said second PNP transistor having a base electrode connected to the collector electrode of said second emitter-coupled transistor to receive said first and second amplifier signals and being responsive to provide a second inverted signal to the base electrode of said second NPN transistor to bias said second NPN transistor into conductive and nonconductive conditions, respectively, to provide a first and a second gating signal on its emitter electrode; and an output NPN transistor having a base electrode connected to the emitter electrode of said second NPN transistor to receive said first and second gating signals and being in a conductive and nonconductive state in response to the presence of said first and second gating signals, respectively, to provide first and second output signals at a collector electrode, said output signals having different first and second voltage levels of like polarity.